June 16, 1959

D. L. NETTLETON 2,891,238

MEMORY SYSTEMS

Filed Feb. 2, 1956

INVENTOR
DAVID L. NETTLETON
BY
ATTORNEY

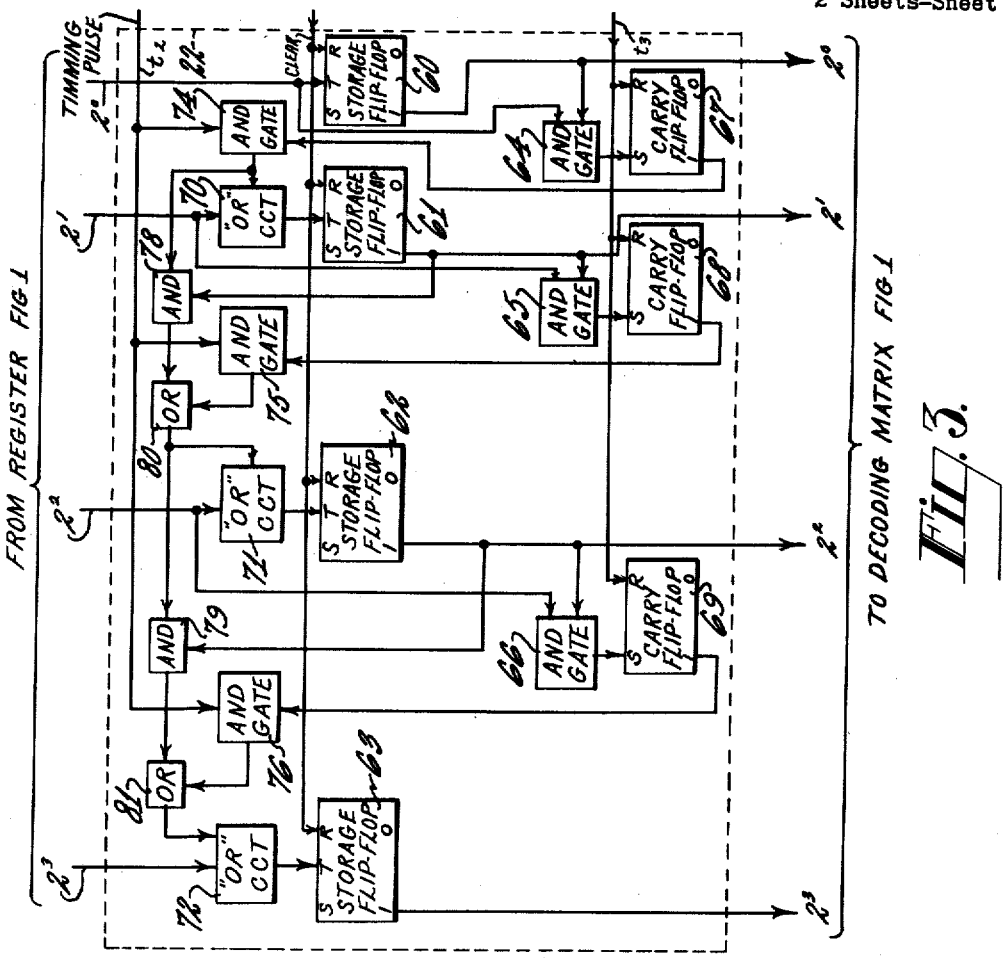
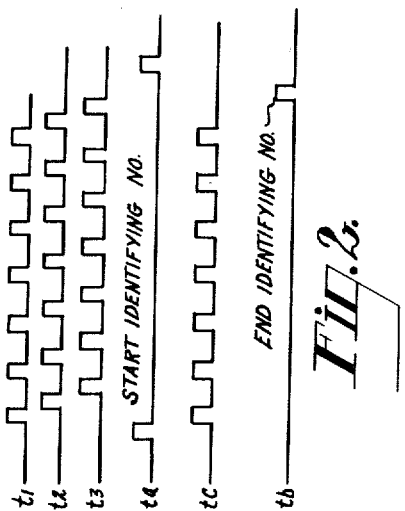

United States Patent Office 2,891,238
Patented June 16, 1959

2,891,238
MEMORY SYSTEMS

David L. Nettleton, Haddonfield, N.J., assignor to Radio Corporation of America, a corporation of Delaware Application February 2, 1956, Serial No. 562,992

12 Claims. (Cl. 340—174)

This invention relates to memory systems, and particularly to an improved system for storing or locating information stored in memory systems.

Large-scale memories are used in conjunction with information-handling machines for storing information. Known memories include magnetic core memories, magnetic drum or disc memories, electrostatic tube memories, and others. Access to information stored in a memory may be obtained, for example, by using identifying numbers corresponding to the coordinates defining the desired portion of the memory. The identifying numbers may correspond, for example, to stock numbers, to customer names or addresses, or some other file item, and may differ with the various functions that the information-handling machine is called upon to perform. Therefore, each character or number is an element of a well-ordered, integral domain.

One problem that exists in connection with memories is that the total range of the identifying numbers may exceed the total number of memory positions; a second problem is that stock numbers, customer names, addresses, etc. may require frequent new entries to up-date the file. When the one problem arises, a one-to-one correspondence between the identifying numbers and the memory positions does not exist and additional storage is required. When the second problem arises, idle memory capacity is often held in reserve for future additional information because each "file" must afford the maximum storage expected for the use of that file alone. In large systems, changes may appear on a day-to-day basis as the incoming information is processed. Therefore, it is desirable to provide a memory system where (1) the total range in the number of identifying numbers can exceed the total number of memory positions without requiring auxiliary circuits or additional memory space, and (2) where changes or obsolescence of identifying numbers do not necessitate rearranging either the contents, or the identification of, the memory positions for efficient use of the memory.

An object of the invention is to provide a memory system which is more efficient than prior systems in the utilization of memory space.

Another object of the present invention is to provide a novel memory system for operation in systems where the total range of identification numbers exceeds the capacity of the memory.

A further object of the present invention is to provide an improved method of, and means for, obtaining access to a memory system which may be, for example, part of an information-handling machine such as a digital computer.

Still another object of the present invention is to provide a method of, and improved means for, operating a memory of an information-handling machine such that changes are permitted in identifying numbers without affecting the contents of the memory.

According to the invention, a memory is divided into a plurality of sections each containing a plurality of memory locations. The range of identifying numbers used in writing and reading information to and from the memory has a range exceeding the total number of memory locations. Each identifying number is transformed into a corresponding number of a smaller range corresponding to the number of these memory sections. Because of the nature of the transformation, approximately the same number of units of information may be assigned to each of the memory sections with a reasonably large sample of identifying numbers. In other words, the transformation is of such nature that the results of the transformation provide a known statistical distribution into classes. Preferably, the distribution results in equal size classes.

The units of information stored in the memory section need not be in ordered form. If the incoming information is new information, it is assigned to any empty space in that section corresponding to its transformed identifying number. If it is desired to locate a stored unit of information, its original identifying number is first transformed, and then a serial search is made of the selected section and the desired unit is located with the aid of the original identifying indicia. The transformation may be carried out, for example, by adding the binary digits of the identifying number and obtaining its sum in a modulus equal to the number of index sections of the memory. Other means for performing transformations which will provide a substantially random distribution of known comparative frequency of occurrence may be employed.

The invention will be described in greater detail in connection with the accompanying drawing wherein:

Fig. 2 is a timing diagram useful in explaining the operation of the system of Fig. 1; and Fig. 3 is a schematic diagram of one form of an accumulator used in performing a transformation on an identifying number.

Figure 1:
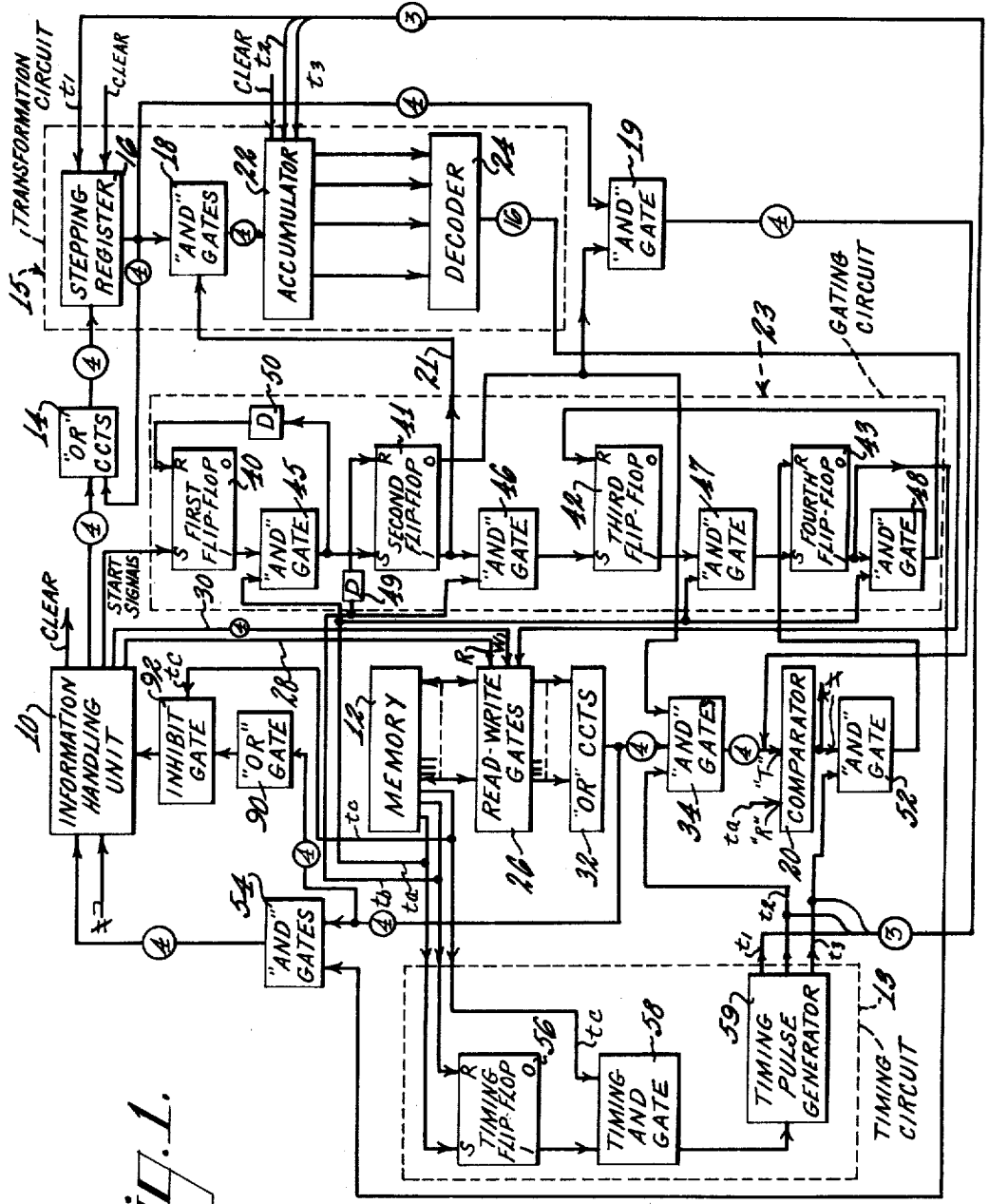
Fig. 1 is a schematic diagram of a system for writing and reading information into and out of the memory of an information-handling system.

Referring to Fig. 1, information originating in an information-handling unit 10 is read into and out of a memory 12 under the control of a transformation circuit 15. A timing circuit 13 is used in timing the flow of information. The information-handling unit 10 may be, for example, an electronic digital computer which operates on binary encoded information, and may contain input-output devices, arithmetic units, buffer storage units, etc.

Each unit of information may contain one or more groups of related items, and each unit may be designated by an identifying group of characters, that is, a number (by "number" is included any ordering system, as alphabetic or alpha-numeric) which precedes the unit. The start and end characters of the identifying number may be respectively preceded and followed by special start and end coded symbols. The respective characters of the identifying number may be coded in any form, for example, binary-coded decimal, and may contain, for example, a sequence of up to seven decimal characters. Thus, any number between $10^0$ and $10^7$ can be represented by a corresponding identifying number comprising a sequence of seven characters each having four binary digits. The seven characters of an identifying number are read sequentially from the information-handling unit 10 through a set of "or" circuits 14 into a stepping register 16 which is part of the transformation circuit 15. The four binary digits of each character are handled in parallel throughout the system. A serial mode of operation may be employed by suitably modifying the system in known fashion.

The set of "or" circuits 14 may include four individual "or" circuits each having two inputs and a single output.

Logical circuits such as "or" circuits and "gate" circuits, including "and" gates and "inhibit" gates, are well-known in the art. One input of each "or' circuit of the set 14 is connected to a respective output of the information-handling unit 10, and the other input of each "or" circuit of the set 14 is connected to a different one of four outputs of the register 16 identified more fully hereinafter. For convenience of drawing, the four leads connecting the information-handling unit 10 and the set of "or" circuits 14 are shown as a single line. The numeral 4 inscribed in a circle is connected in the line to indicate the number of leads. Multi-lead lines are similarly indicated throughout the drawing.

The register 16 may be any known stepping register circuit having provision for storing the seven characters of an identifying number. Thus, the register 16 may comprise a register having seven columns and four rows; corresponding binary digits of the characters may be located in corresponding rows, and the separate ones of the seven characters of an identifying number may be stored in separate ones of the seven columns of the register 16. The highest order character of an identifying number may be stored in the highest order column (the first column) of the register 16. A common clear pulse supplied by the information-handling unit 10 and applied to a common input is used for clearing the register 16 to its initial condition. The number stored in the register 16 is read out, column by column, four rows at a time. These four outputs are one input of, and are applied through, a set of four two-input "and" gates 18 into an accumulator 22. Also, these four outputs are those applied to the respective "or" circuits 14, as mentioned above. The stored number is circulated through the set of "or" circuits 14 back to the register 16. Also, the stored number may be gated through a set of four two-input "and" gates 19 to the respective trigger inputs "T" of four flip-flops of a comparator unit 20, more fully described hereinafter. The seven identifying characters stored in the stepping register 16 are read out of and advanced from one column to a succeeding column under the control of a first timing pulse $t1$ furnished by the timing circuit 13. This timing circuit is more fully described hereinafter. The second input of each of the "and" gates 18 is enabled by a control level furnished on a control lead 21 of the gating circuit 23. The four outputs of the set of "and" gates 18 are applied respectively to four separate stages of an accumulator 22 the output of which is the sum modulo 16 of the entries. The accumulator 22 is described in greater detail hereinafter in connection with Fig. 3. Briefly, the modulo 16 sum is obtained by neglecting any carry digit from the fourth stage of the accumulator 22.

When the gates 18 are enabled by the enabling level on lead 21, the successive characters of an identifying number, beginning with the lowest order character, are gated successively from the stepping register 16 to the four-bit accumulator 22. The sum modulo 16 of the identifying number characters is stored in the accumulator 22, and the four outputs of the accumulator 22 are respectively activated or not, in accordance with the sum modulo 16 of the identifying number. The four outputs of the accumulator 22 are applied to a decoder 24 having four inputs and 16 outputs. The decoder 24 may be any suitable known decoding matrix, for example a crystal diode decoder. For any one combination out of the sixteen possible combinations of inputs applied to the decoder 24, only one of the sixteen output lines is selected, and this one output line is selected for no other combination of inputs. The sixteen outputs of the decoder 24 serve to select a desired one of the sixteen sections of the memory 12.

The memory 12, for example, may be a magnetic drum having sixty-four information tracks in sixteen groups of four information tracks each. Each group of four information tracks then corresponds to one memory section. A magnetic drum is chosen for purposes of simplicity of description, and it is understood that other known memory devices may be employed. Each information track of the drum may have a separate read and a separate write head positioned adjacent that track in a known manner. Each of these separate read heads is connected respectively to a first input of a separate one of sixty-four read gates arranged in sixteen groups of four read gates each, and included in the read-write gates 26. Each separate write head is connected respectively to a separate one of sixty-four write gates arranged in sixteen groups of four write gates each, and included in the read-write gates 26. Each of the read gates of the read-write gates 26 may be a three-input "and" gate circuit, each having a second input connected to a read output bus 28 of the information-handling unit 10. The gates of different groups of the sixteen groups of read gates are enabled at their third inputs by different ones of the sixteen outputs of the decoder 24. Amplifier units may be connected between the respective read heads and first inputs of the read gates. The second and third inputs of the read gates serve as enabling inputs. The four gates of only one of the sixteen groups of read gates are fully enabled at any one time. The signals appearing at the first inputs of the enabled group of read gates are passed therethrough to a set of "or" circuits 32 whose outputs are applied respectively to a set of four three-input "and" gates 34. The set of "or" circuits 32 may be considered as four separate sixteen-input "or" circuits. Corresponding read gates in each of the sixteen groups of four have their outputs connected to corresponding ones of the set of four "or" circuits 32. The four outputs of the "and" gates 34 are applied to the respective trigger inputs "T" of the comparator unit 20, as more fully described hereinafter.

Each write gate of the read-write gates 26 is a two-input "and " gate. The four gates of any group each has one input activated by a different one of the four leads of a write cable 30 connected to the information-handling unit 10. The gates of different groups of the sixteen groups of write gates are enabled at their second inputs by different ones of the sixteen outputs of the decoder 24. The respective outputs of the write gates are connected to the respective write leads of the memory 12, in this instance to the respective write heads of the drum. Thus, information appearing on the write cable 30 is written into that section of the memory 12 corresponding to a transformed identifying number furnished by the transformation circuit 15.

The gating circuit 23 is used to control the flow of information between the information-handling unit 10 and the memory 12. The gating circuit 23 has four flip-flop units 40–43 designated as first to fourth flip-flop respectively. Each flip-flop has a set "S" and a reset "R" input and corresponding "1" and "0" outputs. When a flip-flop is set, its corresponding "1" output level is high relative to its "0" output level and, when reset, its "0" output level is high relative to its "1" output level. Four separate two-input "and" gates 45–48 each have one input connected to the "1" output of a respective one of the four flip-flops 41–43. A timing pulse $ta$, more fully described in connection with Fig. 2, which may be generated by one of three timing tracks of the drum of the memory 12, is applied to the second input of the first, third, and fourth flip-flop "and" gates 45, 47, and 48. A second timing pulse $tb$, which may be generated by a second timing track of the drum of the memory 12, is applied to the second input of the second flip-flop "and" gate 46. The timing pulse $tb$ is also applied through a delay unit 49 to the reset input "R" of the second flip-flop 41. The output of the first flip-flop "and" gate 45 is passed through a delay unit 50 to the reset input "R" of the first flip-flop 40. The delay units 49 and 50 may be any known delay devices, for example, a conventional delay line. The output of the fourth flip-flop "and" gate 48 is applied to the reset input "R" of the third flip-flop 42. The fourth flip-flop 43 of the gating circuit 23 is reset by the output of a two-input "and" gate 52 to which is applied, as one input, the timing pulse *t*3 of the timing circuit 13, and as the second input, the output of the comparator 20.

The comparator 20 may include four triggerable flip-flop circuits (not shown). Each trigger circuit has two stable states, set and reset, and is triggered from its set state to its reset state, or vice versa, when a pulse is applied to one input, a trigger input "T." Each flip-flop circuit has two outputs "1" and "0." When it is in the set state, the "1" output level is high relative to the "0" output level and, when in the reset state, its "0" output level is high relative to its "1" output level. A reset pulse applied to a reset input "R" places a flip-flop in its reset state. Corresponding output signals from the "and" gates 19 and the "and" gates 34, representing the digits in the corresponding binary-digit positions of the identifying numbers read from the stepping register 16 and the memory 12, are applied to the trigger inputs "T" of corresponding ones of the comparator 20 flip-flop circuits. The timing pulse *t*a is applied to the reset inputs "R" of the four flip-flop circuits to set each to its first stable condition. The four "1" outputs of the flip-flop circuits are applied respectively to the inputs of a four-input "or" gate circuit (not shown) also included in the comparator 20. A nearly similar comparator circuit employing triggerable flip-flop circuits is described in a copending application filed by Lowell S. Bensky et al., on June 27, 1952, Serial No. 296,056, for Electronic Comparator Device. The four-input "or" circuit of the comparator 20 furnishes an inequality output, ≠, when any one character read from the stepping register 16 of the transformation circuit 15 does not agree with a character in a corresponding position of an identifying number read from the memory 12.

Accordingly, the fourth flip-flop 43 remains set only when an agreement is obtained between all the corresponding characters of the identifying numbers respectively read from the stepping register 16 and the memory 12. The "1" output of the fourth gating flip-flop 43 is used to enable one input of each of a set of four two-input "and" gates 54. Respective ones of the second inputs of the "and" gates 54 are connected to the four outputs of the memory 12 output "or" gates 32. The four outputs of the set of "and" gates 54 are applied to the four inputs of the information-handling unit 10.

The timing circuit 13 is used for generating three trains of timing pulses designated as *t*1, *t*2, and *t*3 at its outputs, in accordance with three timing pulses *t*a, *t*b, and *t*c, respectively, supplied to its inputs by the three separate tracks of the memory 12. A timing diagram indicating the relative order of the timing pulses *t*1–*t*3, and the timing pulses *t*a, *t*b, and *t*c, is shown in Fig. 2. A series of the timing pulses *t*a are recorded on one track of the drum of the memory 12. A different timing pulse *t*a is positioned just prior to the start of a different identifying number on the information tracks. A series of timing pulses *t*b are recorded on a second of the three timing tracks of the memory drum 12. A different timing pulse *t*b is positioned just after the termination of a different identifying number on the information tracks. A series of separate timing pulses *t*c are recorded on the third timing track of the memory drum 12, one in each position corresponding to the position of a character of each identifying number on the information tracks and also for each character of the succeeding information characters.

Referring again to Fig. 1, each timing pulse *t*a indicates the start of an identifying number on the memory drum 12 and is applied to the "set" input "S" of a timing flip-flop 56. The "1" output of the timing flip-flop 56 enables one input of a two-input timing "and" gate 58. Each of the seven succeeding timing pulses *t*c of Fig. 3 is passed through the timing "and" gate 58 of Fig. 1 to the input of the timing pulse generator 59. The timing pulse *t*b, indicating the end of an identifying number, is applied to the reset "R" input of the timing flip-flop 56, thereby resetting this flip-flop. The seven timing pulses *t*c are used in generating the three trains of seven timing pulses, the pulses of the three respective trains being designated *t*1–*t*3 respectively. The timing pulse generator 59 may include, for example, a series of two delay devices, for example, conventional delay lines (not shown). The timing pulses *t*1 then correspond to the input of the first of the two delay lines (the same as the timing pulse *t*c), and the timing pulses *t*2 and *t*3 respectively correspond to the outputs of the first and second of the delay devices. Any other suitable known timing pulse generator may be employed.

An arrangement of one circuit which is suitable for the accumulator 22 of Fig. 1 is shown in Fig. 3. This accumulator has four separate storage flip-flops 60–63 and three carry flip-flops 67–69. Only three carry flip-flops are required because any carry generated by the highest order $2^3$ storage flip-flop is neglected. The "1" outputs of the first three storage flip-flops respectively enable one input of three carry flip-flop input "and" gates 64–66. The second inputs of the carry input "and" gates 64–66 are respectively activated by the signals representing a binary one appearing on the $2^0$—$2^2$ input leads. The "1" outputs of the carry flip-flops 67–69 respectively enable one input of three separate carry output "and" gates 74–76. The second input of each of the carry output "and" gates 74–76 is activated by the timing pulse *t*2. Thus, two binary one's, one stored and one incoming, in the same binary position of the three lower-order positions, operate to generate a first carry signal at time *t*2. This first carry signal is applied through one input of a succeeding one of three two-input "or" circuits 70–72 to the trigger-input "T" of the succeeding three storage flip-flops 61–63. Activation of the trigger input "T" of a flip-flop causes it to change state from set to reset, or vice versa. A first carry signal from one stage and a stored binary one from the next succeeding stage are combined in one of two, second-carry "and" gates 78–79. One input of the second-carry "and" gates 78 is activated by the output of the first-carry "and" gate 74 and the other input of the carry gate 78 is enabled by the "1" output of the $2^1$ storage flip-flop 61. The other second-carry gate 79 has one input enabled by the "1" output of the $2^2$ storage flip-flop 62. The second input of the second-carry gate 79 is activated either by the output of the second carry "and" gate 75 or the output of the first carry "and" gate 78, applied through a two-input carry "or" circuit 80. The output of the "or" circuit 80 is also applied as the second input of the two-input "or" circuit 71. The output of the carry output "and" gate 76 and the second carry gate "and" 79 are applied to a two-input carry "or" circuit 81. The output of the carry "or" circuit 81 is applied as the second input of the $2^3$ stage input "or" circuit 72, and thence to the trigger input "T" of the $2^3$ storage flip-flop 63.

The operation of the memory system is most easily explained by way of example. Assume that it is desired to select information stored in the memory which corresponds to an identifying number 6730428. The seven numerical digits of the identifying number are expressed in binary-coded decimal form by the series of seven binary digits 0110, 0111, 0011, 0000, 0100, 0010, 1000, where the binary digit 1000 (=decimal number 8) is the lowest order digit of the binary number, and the binary digit 0110 (=decimal number 6) is the highest order digit of the binary number. The sum modulo 16 of the binary number is the binary number 1110 which is the same as the number 14 in decimal notation.

At the start of the selection operation, a clear signal generated by the information-handling unit 10 clears the stepping register 16 and resets the flip-flops of the accumulator 22. The clear signal may also be used for resetting the gating circuit 23 flip-flops and the timing flip-flop 56 although, for convenience, the connections for the latter purpose are not shown. The gating levels for controlling the transformation of the identifying number are established by the gating circuit 23 in conjunction with the timing pulses *ta–tc*. A start signal generated by the information-handling unit 10 is applied to the set input "S" of the first flip-flop 40 of the gating circuit 23. This flip-flop enables the "and" gate 45 connected thereto. The first timing pulse *ta*, generated by the first timing track of the memory 12, is passed through the enabled "and" gate 45 to the set input "S" of the second gating flip-flop 41. The output of the "and" gate 45 is also passed through the second delay unit 50 to the reset input "R" of the first flip-flop 40, thereby removing the enabling level from the first "and" gate 45. The "1" output of the second flip-flop 41 enables one input of each of the set of "and" gates 18 of the transformation circuit 15. Prior to the establishment of any of the gating levels of the gating circuit 23, the signals representing the respective characters of the identifying number are read into and are stored in the elements of the respective columns of the stepping register 16 of the transformation circuit 15 via the set of "or" gates 14. Thus, the first timing pulse *t1* following the timing pulse *ta* reads out the lowest order character (the decimal number 8) from the stepping register 16, through the set of enabled "and" gates 18 to the storage flip-flops of the accumulator 22. Each successively higher order character of the identifying number is read in succession through the "and" gates 18 to the accumulator 22. Any carry digits generated in the accumulator 22 are transferred within the accumulator 22 by the timing pulse *t2* which succeeds each timing pulse *t1*. The carry flip-flops 67–69 (Fig. 2) of the accumulator 22 are reset by the next timing pulse *t3* which succeeds a timing pulse *t2*. After the seventh column of the stepping register 16 has been read out to the accumulator 22, a modulo 16 sum thereof (the binary number 1110) is represented by the signals appearing on the corresponding input leads to the decoder 24 of the transformation circuit 15. The decoder 24 operates to decode the binary input signals and raises the level of its fourteenth output lead corresponding to the sum, modulo 16, of the digits of the identifying number. The level on this fourteenth lead, in conjunction with the level established on the read bus 28 by the information-handling unit 10, enables the set of four read gates associated with the fourteenth section of the memory 12. The outputs of the stepping register 16 are circulated back to the corresponding columns thereof via the set of "or" gates 14. The timing pulse *tb* is passed through the second enabled "and" gate 46 of the gating circuit 23 to the set inputs "S" of the third flip-flop 42. The timing pulse *tb* is also passed through the first delay unit 49 to the reset input of the second flip-flop 41 of the gating circuit. Accordingly, the enabling level appearing on the first output 21 of the gating circuit 23 is removed from the set of "and" gates 18. The "0" output of the second flip-flop 41 enables the set of "and" gates 19 connected to the output of the stepping register 16, and also enables the set of "and" gates 34 connected to the outputs of the "or" circuits 32 associated with the memory 12. The second timing pulse *ta* is passed through the enabled third "and" gate 47 of the gating circuit 23 to the set input "S" of the fourth flip-flop 43. The "1" output of the flip-flop 43 enables the fourth gating circuit "and" gate 48. At each successive timing pulse *t1*, following the second timing pulse *ta*, a binary character is read out of the stepping register 16 of the transformation circuit 15 and passed through the set of "and" gates 19 to the respective trigger inputs "T" of the four trigger circuits of the comparator 20, which were initially reset by the first timing pulse *ta*.

The second timing pulse *ta* also sets the timing flip-flop 56 of the timing circuit 13. The "1" output of the timing flip-flop 56 enables the timing "and" gate 58, and each succeeding timing pulse *tc*, corresponding to the position of an identifying character stored in the memory 12, is passed through the timing "and" gate 58 to the input of the timing pulse generator 59, thereby initiating generation of a cycle of the timing pulses *t1*, *t2* and *t3*. Each identifying character following the second timing pulse *ta* activates the enabled set of read gates of the read-write gates 26. The signals representing the information stored in the selected, fourteenth section of the memory 12 are passed through the enabled read gates and the "or" gates 32 to the set of "and" gates 34. The timing pulse *t2* activates the set of "and" gates 34 and the outputs thereof are applied to the respective trigger inputs "T" of the comparator 20. Thus, if the first identifying character, read from the stepping register 16 of the transformation circuit 15, and the first identifying character, read from the memory 12, are identical, each of the four comparator trigger circuits is in a reset condition. Accordingly, no enabling output is furnished by the comparator 20 and the "and" gate 52 connected to the comparator 20 output is not enabled. Corresponding characters from the stepping register 16 and the selected, fourteenth section of the memory 12 are compared in the comparator 20. If all seven binary characters are identical, the "and" gate 52 is not activated by any of the succeeding seven timing pulses *t3*. Accordingly, the fourth flip-flop 43 of the gating circuit 23 remains set, and the fourth "and" gate 48 remains enabled. The first timing pulse *ta*, following an equality indication of two identifying numbers, is passed through the fourth gating circuit "and" gate 48 to the reset input "R" of the third gating circuit flip-flop 42, thereby preventing further comparison between the number stored in the stepping register 16 and numbers stored in the memory 12 by disenabling the set of "and" gates 19 and the set of "and" gates 34.

The "1" output of the fourth gating circuit flip-flop 43 enables the set of input "and" gates 54. As the identifying numbers are read out from the "or" circuits 32, associated with the memory 12, they are passed through the enabled "and" gates 54 to the inputs of the information-handling unit 10. Succeeding information characters, representing blocks of information associated with the selected identifying number, are applied through the set of "and" gates 54 to the information-handling unit 10.

If any two characters, one from the stepping register 16 and one from the selected section of the memory 12, are different from each other, the comparator 20 furnishes an inequality, $\neq$, signal which enables the "and" gate 52 connected to its output. The succeeding timing pulse *t3* is then passed through the "and" gate 52 to the reset input "R" of the fourth flip-flop of the gating circuit 23, thereby blocking any signals from being transferred through the "and" gates 54 to the information-handling unit 10. The fourth flip-flop 43 of the gating circuit remains reset until the timing pulse *ta*, preceding the next identifying number, is passed through the third "and" gate 47 of the gating circuit 23 to set the fourth flip-flop 43. Thus, successive comparisons are carried out between the identifying number stored in the stepping register 16 and the successive identifying numbers appearing in the selected section of the memory 12. When the identifying number, corresponding to that stored in the stepping register 16, is observed, the succeeding information characters are transferred to the information-handling unit 10.

A desired block of information may be read from the information-handling unit 10 into a section of the memory 12. In such case the write cable 30 is activated by the information-handling unit 10. The identifying characters of the block of information to be written into the memory 12 are added modulo 16 by the transformation circuit in a manner similar to that described above, thereby determining one of the sections of the memory 12 by enabling the set of write gates associated with the selected section. Successive information signals appearing on the write cable 30 activate the enabled set of write gates of the read-write gates 26, writing the desired information into the memory 12. The information signals are stored in the first vacant portion of the selected memory section. A vacant section may be determined by using a so-called "read-before-write" method. In using this method, the information-handling system first raises the enabling level on the read bus 28. The outputs of the "or" circuits 32 are applied to the different inputs of a four-input "or" circuit 90 whose output is applied to the inhibit input of an inhibit gate 92. The timing pulse *tc* is applied to the second input of the inhibit gate 92. An output is furnished by the inhibit gate 92 only when no output signals are furnished by the portion of the selected section of the memory 12 that is momentarily being read. Upon receipt of an output signal from the inhibit gate 92, the information-handling unit 10 operates to change the level on the read bus 28 and to supply information signals to the write cable 30. Successive characters are gated into successive positions of the vacant portion of the selected section of the memory 12. Information may be deleted by writing zeros over selected items.

The above description of a suitable method of writing information into the memory 12 implies a so-called "standard word length" system; that is, each block of information has a specified number of characters, information or dummy, and each unit of information has a specified number of blocks. However, the system of the present invention may be used with so-called "variable-word-length" systems; that is, a unit of information has a varying number of blocks containing varying numbers of information characters. The start and end of any unit or block of information is located by means of special characters such as "start message," "end message," or "end data" symbol. These symbols are ones having unique combinations of binary digits and may be recognized by special code-recognition devices associated with the read-out circuitry of the memory 12. The memory 12 may also include a compression system, such as that disclosed in an application filed by David L. Nettleton, et al., on September 23, 1955, Serial No. 536,200, for Compression System, and the present invention may be practiced in conjunction with such a compression system.

Other known cyclic-type memories, such as magnetic discs, may be used for the memory 12. If discs are used, a selected memory section may contain one or more of the magnetic discs. The system of the present invention may also be used with random-access memories where data is stored in positions, that is, at "addresses," represented by spaced coordinates. The random-access address circuitry may then be operated sequentially to read out the identifying characters stored in a sequence of the positions of a selected portion of the random-access memory.

Other means for transforming identifying numbers of a larger set of numbers into corresponding numbers of a smaller set of numbers may be employed within the scope of the present invention. For example, successive characters of an identifying number may be alternately added to, or subtracted from, each other to yield a corresponding number of a smaller set.

There has been described herein an improved memory system for operation in conjunction with an information-handling unit. The improved memory system of the present invention provides means for utilizing the internal memory of an information-handling machine in a more efficient manner. By transforming an identifying number in accordance with the present invention, a smaller capacity memory may be used to accommodate an extensive class of information units having an absolute range greater than the absolute capacity of the memory.

What is claimed is:

1. A system comprising a memory having "$n$" well-ordered sections, each section having a plurality of locations for storing information, a transformation means having an input and an output and including means for transforming character-representing signals received at its input into signals representing the sum modulo "$n$" of said character-representing signals, each different character represented by said signals being a member of an integral domain, and means coupled to said transformation means output for selecting the one of said memory sections corresponding to said sum modulo "$n$" signals.

2. A system comprising a memory having well-ordered sections, each section having a plurality of locations for storing information, means having an input and an output and including means for transforming a group of character-representing signals received at said input into signals representing the sum modulo the number of said memory sections at said output, each different character represented by said signals being a member of an integral domain, and means coupled to said output for selecting the one of said memory sections corresponding to said modulo sum of said character-representing signals.

3. A system comprising a memory having well-ordered sections, each section having a plurality of locations for storing information, means having an input and an output and including means for transforming a group of character-representing signals received at said input into signals representing the sum modulo the number of said memory sections at said output, each different character represented by said signals being a member of an integral domain, each of said character-representing signals including a combination of "$m$" binary signals, said transforming means including an accumulator having "$m$" stages, $M-1$ of said stages being arranged to generate carry signals, and means coupled to said output for selecting the one of said memory sections corresponding to said modulo sum of said character-representing signals.

4. A system comprising a memory having well-ordered sections, each section having a plurality of locations for storing information, means having an input and an output and including means for transforming a group of character-representing signals received at said input into signals representing the sum modulo the number of said memory sections at said output, each different character represented by said signals being a member of an integral domain, said transforming means including a decoding means for decoding said signals representing the sum modulo the number of said memory sections into a single selecting signal, and means coupled to said output for selecting the one of said memory sections corresponding to said modulo sum of said character-representing signals in accordance with said selecting signal.

5. A memory system comprising a plurality of well-ordered memory sections for storing information units, different ones of said units being identified by different identifying numbers of a first set, means for transforming each identifying number of said first set into an identifying number of a second set and for furnishing output signals in accordance therewith, the range of said first set of identifying numbers being greater than that of said second set of identifying numbers, means responsive to said transforming means output signals for selecting that section of said memory corresponding to said identifying number of said second set, means for writing the said information unit identified by said transformed identifying number into said selected memory section, and means for reading stored ones of said information units out of said selected memory section.

6. A system comprising a plurality of well-ordered memory sections, each section having a plurality of locations for storing information units, separate ones of said units being identified by different ones of a plurality of identifying numbers, each of said numbers including a group of characters, transformation means having an input and an output and including means for transforming signals representing any particular identifying number received at said input into a corresponding signal at said output, said output signal representing a corresponding transformation number, said transformation number being one of a plurality of numbers having a range smaller than that of said identifying numbers, decoding means coupled to said output and responsive to said output signal for furnishing a selecting signal indicative of said transformation number, a read-out means for each of said memory sections, said selecting signal operating to enable one of said read-out means to select a desired memory section, and means for detecting an equality between said received identifying number and any of said identifying numbers read out of said selected memory section by said enabled read-out means.

7. In a memory system, the combination of means for changing a plurality of groups of coded signals, each different group of signals corresponding to an element of an integral domain, each group having "$m$" binary positions, into a single group of signals representing the sum modulo $2^m$ of said plurality, a memory having $2^m$ separate, well-ordered sections, and means for selecting the one memory section corresponding to said single group of signals for either writing information into or reading information out of said selected memory section.

8. In a memory system, the combination of means for changing a plurality of groups of coded signals, each different group of signals corresponding to an element of an integral domain, each group having "$m$" positions, into a single group of signals having "$m$" positions, a memory having a plurality $2^m$ of separate, well-ordered sections, and means for selecting the one memory section corresponding to said single group of signals for either writing information into or reading information out of said selected memory section.

9. In a memory system, the combination of means for changing a plurality of groups of coded signals, each different group of signals corresponding to an element of an integral domain, each group having "$m$" binary positions, into a single group of coded signals indicative of the sum modulo $2^m$ of said plurality of groups of coded signals, a memory having $2^m$ well-ordered sections each of said sections having a plurality of locations for storing information, means responsive to said single group of coded signals for selecting the one of said $2^m$ memory sections corresponding to said single group of coded signals, and means for writing information into said plurality of locations of said one memory section.

10. In a memory system, the combination of means for changing a first group of identifying numbers each having "$m$" binary positions into a single number having "$m$" binary positions and indicative of the sum modulo $2^m$ of said group of identifying numbers, a memory having $2^m$ well-ordered sections, means responsive to signals representing said single number for selecting one of said $2^m$ sections, means for reading information stored in said one memory section, each unit of stored information being preceded by its own group of identifying numbers, and means including comparing means responsive to signals representing said first group of identifying numbers and to signals representing said groups of identifying numbers read from said one memory section for determining an equality between said first group of identifying numbers and any one group of said groups of identifying numbers read from said one memory section.

11. In a memory system, the combination of means for changing signals belonging to one class into signals belonging to another class, said one class having a larger number of members than said other class, a memory having a plurality of well-ordered memory sections each said section having a plurality of memory locations, means for selecting individual ones of said memory sections respectively corresponding to individual ones of said signals of said other class and means for storing signals of said one class in the locations of said selected memory sections.

12. In a memory system, the combination of means including an arithmetic unit for changing signals belonging to one class into signals belonging to another class, said one class having a larger number of members than said other class, a memory having a plurality of well-ordered memory sections, means for selecting individual ones of said memory sections respectively corresponding to individual ones of said signals of said other class and means for storing signals of said one class in the locations of said selected memory sections.

References Cited in the file of this patent

UNITED STATES PATENTS

| | | |
|---|---|---|
| 2,587,532 | Schmidt | Feb. 26, 1952 |
| 2,724,739 | Harris | Nov. 22, 1955 |
| 2,815,168 | Zukin | Dec. 3, 1957 |